United States Patent [19]
Jopson

[11] Patent Number: 5,257,289
[45] Date of Patent: Oct. 26, 1993

[54] HIGH-SPEED HYBRID TRANSMISSION INTERFACE

[75] Inventor: Charles M. Jopson, Boise, Id.

[73] Assignee: Extended Systems, Inc., Boise, Id.

[21] Appl. No.: 728,449

[22] Filed: Jul. 11, 1991

[51] Int. Cl.⁵ ............................................. H04L 29/10
[52] U.S. Cl. ......................................... 375/36; 375/8;
 375/121; 340/310 CP
[58] Field of Search ................... 375/7, 8, 36, 37, 121;
 307/1, 8; 340/310 A, 310 R, 310 CP; 178/4.1
 C, 69 H; 341/100, 101; 379/93, 96-99

[56] References Cited

U.S. PATENT DOCUMENTS

| | | | |
|---|---|---|---|
| 4,627,073 | 12/1986 | Shepperd et al. | 375/36 |
| 4,764,939 | 8/1988 | Rogers | 375/36 |
| 4,884,287 | 11/1989 | Jones et al. | 375/121 |

FOREIGN PATENT DOCUMENTS 0113938 5/1991 Japan .................... 375/36

*Primary Examiner*—Curtis Kuntz
*Assistant Examiner*—Young Tse
*Attorney, Agent, or Firm*—Townsend and Townsend Khourie and Crew

[57] ABSTRACT

A high-speed long-line data interface is provided which employs two pre-configured parallel connectors coupled by four lines. One connector is a convert/transmit connector and the other is an unconvert/receive connector. Each connector includes a processor which buffers incoming data. The four lines include an RS-422 pair of differential transmission lines, an RS-232 status line and a ground line. Incoming parallel data is converted to serial format, then transmitted over the differential transmission lines to the unconvert/receive connector. The serial data then is unconverted back to parallel format and output to the peripheral device. Status information is sent from the peripheral to the host computer over the status line as a multi-byte pulse encoded signal. Power for the convert/transmit connector is derived parasitically from the unconvert/receive connector via the status line. Storage capacitors store charge from the status line for driving the connector during a status transmission. The convert/transmit connector self-paces its power consumption. A voltage level sensor is included for monitoring the voltage level of the parasitically-derived power signal. If the voltage goes below a threshold level (i.e., 4.5 volts), then data transmission is delayed for a programmable time period.

11 Claims, 3 Drawing Sheets

HIGH-SPEED HYBRID TRANSMISSION INTERFACE

BACKGROUND OF THE INVENTION

This invention relates to a data transmission interface, and more particularly to a high-speed interface having parallel-data connections and serial-data transmission lines.

Data communications among devices on a network or between a host and a peripheral device typically employ standard connectors and standard transmission lines. For example, the Centronics interface is a popular parallel transmission interface which includes a pair of 38-pin connectors and multiple data transmission lines. As another example, the RS-232 interface is a popular serial transmission interface standard specifying a pair of 9-pin connectors and a pair of serial data transmission lines.

An advantage of parallel interfaces, such as the Centronics interface, over serial interfaces such as RS-232 interfaces is the relatively higher transmission speed. However, parallel interfaces are constrained to a relatively shorter transmission length. Conversely, serial interfaces may support long-line transmissions, but are slower than parallel interfaces.

Accordingly, there is a need for a high-speed long-line interface for hard-wired data communications.

SUMMARY OF THE INVENTION

According to the invention, a high-speed long-line data interface is provided which employs parallel connectors and serial transmission lines. Data is received in parallel format, converted to serial format, transmitted over a pair of serial data lines, then converted back to parallel format for output.

According to one aspect of the invention, the interface includes two pre-configured parallel connectors coupled by four lines. One connector is a convert/transmit connector and the other is an unconvert/receive connector. Each connector includes a processor which buffers incoming data. In one embodiment, the four lines include an RS-422 pair of differential transmission lines, an RS-232 status line and a ground line. The convert/transmit connector converts incoming parallel data to serial format, then transmits the serial data along the differential transmission lines. The unconvert/receive connector receives the serial data, unconverts the serial data back to parallel format and outputs the parallel data to the peripheral device. Status information is sent from the peripheral to the host computer over the status line as a multi-byte pulse encoded signal. By using a processor at each connector, high-speed data transmission (e.g., speeds comparable to parallel port communications) is achieved. By transmitting the data over serial transmission lines, long-lines communication (e.g., lengths supported serial transmission lines) is achieved.

According to another aspect of the invention, power for one connector (i.e., the convert/transmit connector) is derived parasitically from the other connector (i.e., unconvert/receive connector) via the status line. The status line normally is at +8 to +12 volts and pulses to −12 volts to send the multi-byte pulse encoded signal. The convert/transmit connector uses the +8 to +12 volt signal to derive power. The 8–12 volt signal is input to a voltage regulator which supplies a voltage power signal to the electrical components of the convert/transmit connector.

According to another aspect of the invention, the connector which derives power (e.g., the convert/transmit connector) self-paces its power consumption. The convert/transmit connector includes storage capacitors for storing charge from the status line. (Diodes are included for preventing full discharge during a multi-byte pulse encoded status signal). The convert/transmit connector also includes a voltage level sensor for monitoring the voltage level of the power signal received from the voltage regulator. If the voltage goes below a threshold level (i.e., 4.5 volts), then data transmission is delayed for a programmable time period. Because most of the power used by the convert/transmit connector is consumed by the line drivers when driving the differential transmission lines, suspension of data transmission eases the power consumption. During such delay, the storage capacitors are recharged and the power signal voltage level is restored.

The invention will be better understood by reference to the following detailed description taken in conjunction with the accompanying drawings.

DESCRIPTION OF SPECIFIC EMBODIMENTS

Overview

Figure 1:
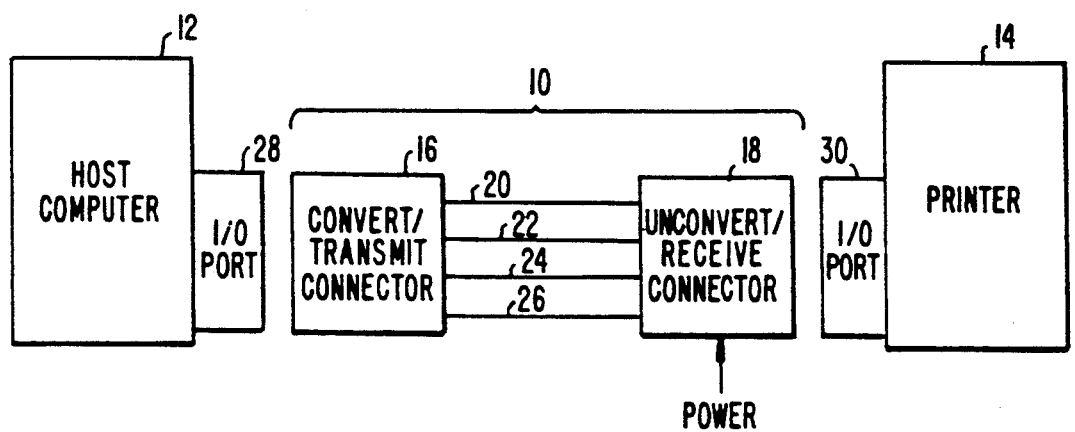
FIG. 1 is a block diagram of hybrid transmission interface environment according to an embodiment of this invention.

FIG. 1 shows the hybrid interface 10 as coupled to a host computer 12 and a peripheral printer device 14. The function of the hybrid interface 10 is to serve as the hard-wired signal path for control and data communications between the host computer 12 and peripheral device 14. The interface 10 transfers data from the host computer 12 to the printer 14 at a rate of approximately 12–30 KBytes per second up to the maximum length supported by conventional RS-422 serial transmission lines. According to one embodiment, data is transferred over the serial transmission lines at 230.4 KBaud (e.g., 28.8 KBytes per second).

The interface 10 includes parallel connectors 16, 18, serial (RS-422 differential) transmission lines 20, 22, serial (RS-232 signal level) status line 24 and ground line 26. Connector 16 is configured as a convert/transmit connector, while connector 18 is configured as an unconvert/receive connector. The transmission lines 20, 22 are implemented as an RS-422 differential pair. Power is supplied to the connector 18 from a conventional AC power line (i.e., from a wall socket) via an AC to DC transformer (not shown). Connector 16 derives its power parasitically from the connector 18 via status line 24.

For the environment depicted in FIG. 1, parallel data is sent from host 12 via I/O port 28 to connector 16. The connector 16 converts the parallel data to serial format and transmits the serial data along transmission lines 20, 22 to connector 18. Connector 18 receives the serial data, unconverts the data back to parallel format, then outputs the parallel data to the printer 14. Status information is sent from the printer or unconvert-/receive connector 18 to the host via connector 18, status line 24 and convert/transmit connector 16. The status line normally is at approximately +10 volts and pulsed down to −12 volts to carry a multi-byte pulse encoded status signal.

Convert/Transmission Configuration

Figure 2:
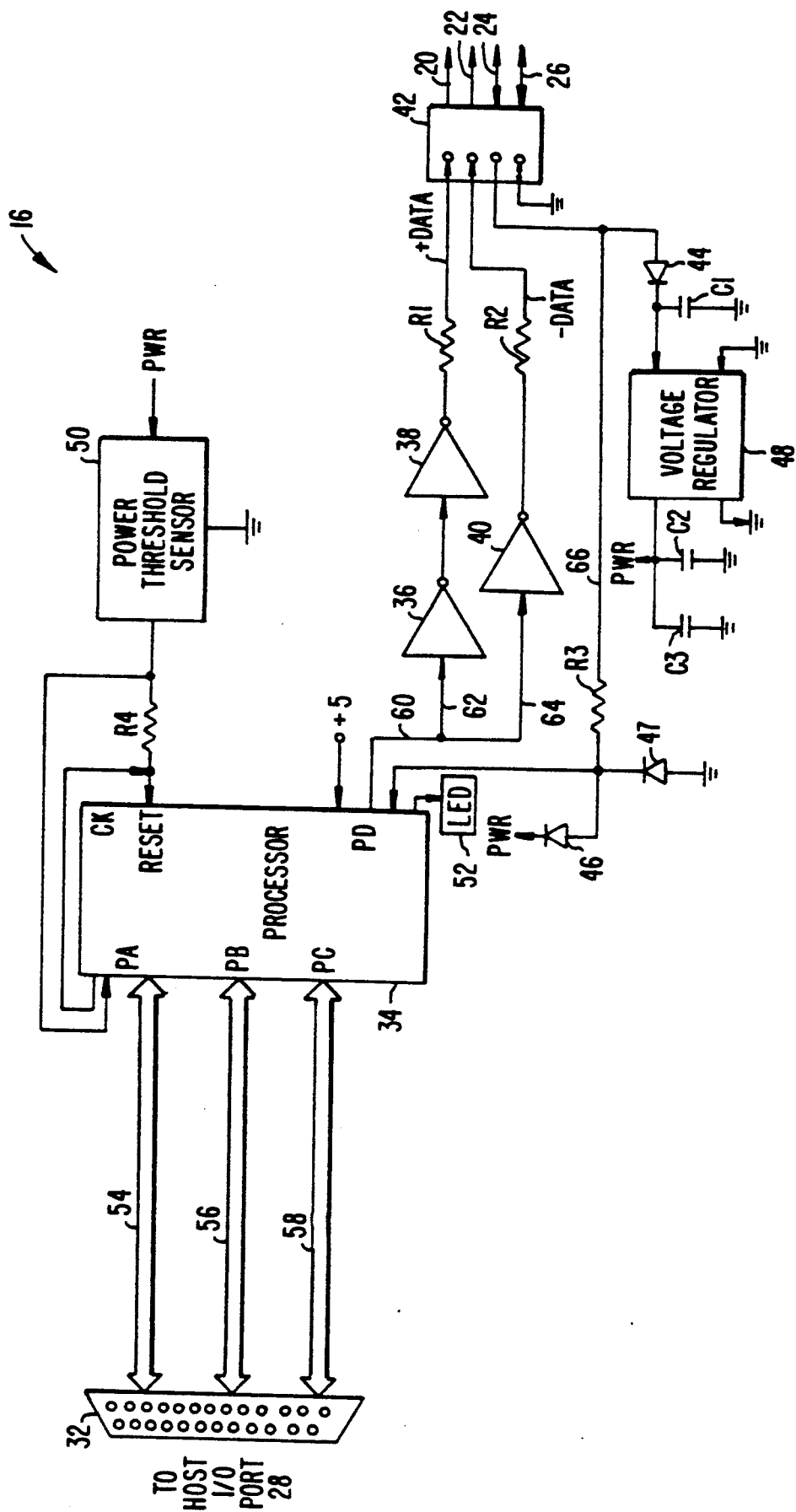
FIG. 2 is a schematic diagram of an interface connector of FIG. 1 configured as a convert/transmission link.

FIG. 2 is a schematic diagram of the convert/transmit connector 16. The connector 16 is coupled to the host I/O port 28 and serves to convert parallel data to serial data and transmit the serial data over the differential transmission lines 20, 22. The connector 16 includes a standard DB-25 25-pin connector 32, a 6805C8 microprocessor 34, inverting drivers 36, 38, 40, coupling jack 42, diodes 44, 46, 47, voltage regulator 48, power threshold sensor 50, LED 52, capacitors C1, C2, C3 and resistors R1, R2, R3, R4. Also included are flip-flop devices, invertors and pull-up resistors (not shown) which couple the parallel data lines, status lines and control lines from the DB-25 connector 32 to the microprocessor 34.

The DB-25 connector 32 engages a mating connector at the host I/O port 28. Status signals (i.e., paper empty, printer selected, printer error) are routed from the processor 34 to the DB-25 connector 32 over plural signal paths 54. Each status signal has a dedicated signal path which couples a specific pin on the DB-25 connector 32 to a specific pin at port PC of processor 34. Data is sent from the host through DB-25 connector 32 to the processor 34 over bus 56. Control signals (i.e., busy, acknowledge, initialize) are exchanged between the host 12 and processor 34 over plural signal paths 58. Each control signal has a dedicated signal path which couples a specific pin on the DB-25 connector 32 to a specific pin at port PC of processor 34.

Data from the host computer 12 is sent to the processor 34 in parallel format. Processor 34 includes internal memory in which the received parallel data is stored. According to one embodiment, software implements a 32-byte FIFO in the memory area of processor 34. Data moved out of the FIFO is serially transmitted out port PD along signal path 60 to signal paths 62, 64. Signal path 62 includes two inverting drivers 36, 38 and resistor R1. A +DATA signal is output from the drivers 36, 38 and sent to jack 42 onto transmission line 20 for routing to the connector 18. Signal path 64 includes one inverting driver 40 and resistor R2. A −DATA signal is output from inverting driver 40 and sent to jack 42 onto transmission line 22. While data is being transmitted over transmission lines 20, 22, LED 52 is activated to provide a visual data transfer indication.

Communication status signals from the printer 14 and unconvert/receive connector 18 are received via status line 24 into connector 16 at jack 42. Status communication over the status line 24 is asynchronous to the data communication over transmission lines 20, 22. When the status line 24 is idle, the voltage level remains at approximately 8-12 volts, typically 10 volts. When status indications are sent, the status line 24 pulses down to −12 volts, routing a multi-byte sequence. The received status signals are routed over signal path 66 to processor port PD. As the status line 24 also is used for parasitically deriving power for connector 16, the status signal path 66 is coupled to a voltage clamp. Resistor R3 and diodes 46, 47 form the clamp. Diode 46 protects the processor 34 from being exposed to a voltage level above a given level (i.e., 5.7 volts), while diode 47 protects the processor 34 from being exposed to a voltage level below a given level (i.e., −0.7 volts).

To derive power from the status line 24, a diode 44, voltage regulator 48 and capacitors C1, C2, C3 are coupled to the status signal terminal of jack 42. Dual diode 44 receive the +8 to +12 volt power signal over the status line 24 feeding out a signal to capacitor C1 and voltage regulator 48 in parallel. Capacitor C1 is a storage capacitor which stores charge. Voltage regulator 48 regulates the received voltage input to generate a power signal PWR output which is the supply voltage signal for the electrical components of connector 16. Capacitors C2, C3 also are storage capacitors. When the status line 24 becomes active (e.g., pulses down to −12 volts), capacitors C1, C2 and C3 discharge providing power for convert/transmit connector 16. Diode 44 prevents the status line from draining C1 when the status line is active. The time limit, t, that the status line can be kept active is given by:

$$t = (C * (Vs - Vd))/I$$

where:
C = the capacitance of C1;
Vs = the status line high voltage minus voltage drop across dual diode 44;
Vd = the dropout voltage of regulator 48;
I = the current draw of the convert/transmit connector 18.

Thus, the status transmissions are kept at a time less than t. According to one embodiment, up to 16 status indications (bytes) may be transmitted as part of a multi-byte sequence for an embodiment in which C1=22 micro-farads, C2=22 micro-farads, C3=0.1 micro-farad, R1=R2=56.2 ohms and R2=R3=R4=4.64 kilohms.

Power use by the convert/transmit connector 16 is categorized as static power use or dynamic power use. Static power use is minimized by using CMOS circuitry for the electronic components. Most of the power consumption during dynamic power use is related to the charging and discharging of the transmission lines 20, 22. To minimize dynamic power consumption and still drive long-line transmission lines 20, 22, self-pacing software and circuitry is used.

Power threshold sensor 50 monitors the power signal PWR from the voltage regulator 48. The output line of the sensor 50 is coupled to the reset pin of processor 34 via resistor R4. An output line from port PA of processor 34 also is coupled to the reset pin, but as a direct coupling. During power up the output from PA is at a high impedance causing the output of the sensor 50 to define the signal input to the reset pin. When power reaches a threshold level (i.e., 4.5 volts), then the output is driven high removing the reset condition from the reset pin. The reset caused prior to such transition, however, causes, resets the processor resulting in initialization and self test software execution. Thereafter, the PA line is driven high preventing an automatic reset from occurring.

When the power voltage goes below a threshold level (i.e., 4.5 volts), the sensor output (e.g., a level indicator signal) is driven low. The PA output, however, is high. Resistor R4 prevents the level indicator signal from driving the reset line low. Instead, the level indicator signal is read at another input to port PA. The processor 34 detects the low level, continues to drive PA output line coupled to the reset pin high, thereby preventing an automatic reset. The processor 34, in addition, suspends data transmission. The processor 34 then waits a time-out period (depending on the capacitance of C1) (i.e., 320 microseconds), then re-monitors the level indicator signal. If the level is still low, then the processor 34 switches the PA output line coupled to the reset pin low, so as to self-generate a reset. Once reset, the processor 34 sets the appropriate PA pin to high impedance allowing the sensor 50 output signal to determine the reset condition. When the power reaches the appropriate threshold level again, the reset pin is no longer activated and the initialization and self-test software is executed. Eventually the PA output line coupled to the reset pin is driven high again preventing automatic resets.

If the level indicator signal has returned high after the 320 micro-second time-out period, then the voltage drop was due to the dynamic power consumption of driving the transmission lines 20, 22. Thus, the connector 16 is using more power than parasitically derived from the status line 24. The processor then paces itself by waiting a prescribed time period (i.e., 2 milliseconds) before resuming data transmission. During such delay, the storage capacitors C1, C2, C3 store charge from the status line 24 so as to boost the voltage level of the PWR signal output from regulator 48.

Unconvert/Receive Configuration

Figure 3:
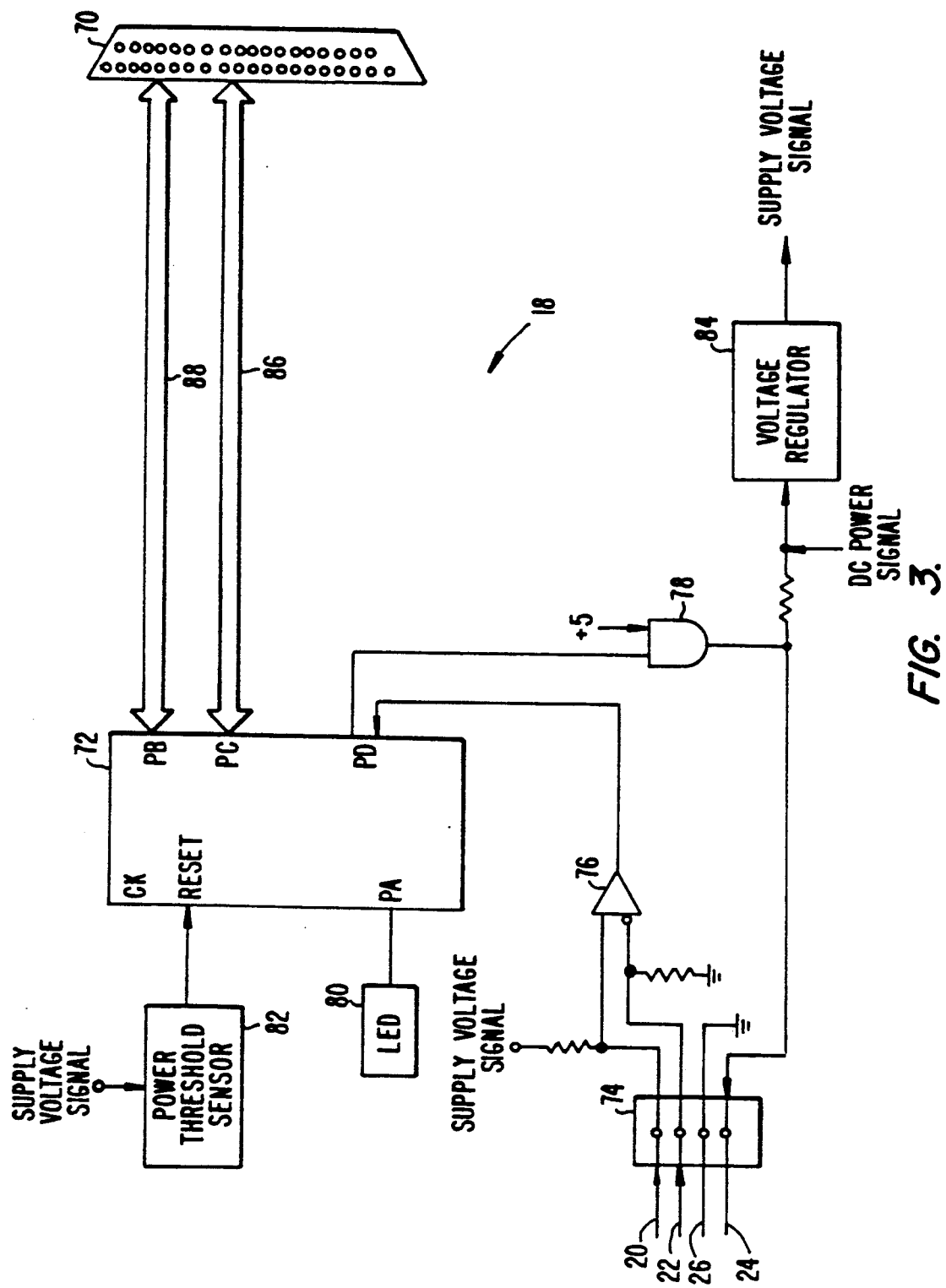
FIG. 3 is a schematic diagram of an interface connector of FIG. 1 configured as an unconvert/receive link.

FIG. 3 is a schematic diagram of the unconvert/receive connector 18. The connector 18 is coupled to the convert/transmit connector 16 and the printer I/O port 30. Connector 18 serves to unconvert received serial data back to parallel data, then output the parallel data to the printer 14. The connector 18 includes a standard Centronics 38-pin connector 70, a 6805C8 microprocessor 72, coupling jack 74, buffer 76, AND gate 78, LED 80, power threshold sensor 82 and voltage regulator 84. Also included, but not shown, are signal path drivers, pull-up resistors and pull-down resistors for driving signals within the connector 18. For example, the status and control signals received from the printer 14 via the 38-pin connector 70 are coupled to the processor through inverting drivers (not shown) and plural signal paths 86.

The 38-pin connector 70 engages a mating connector at the printer I/O port 30. Status signals (i.e., paper empty, printer selected, printer error) are routed from the printer 14 to the 38-pin connector over plural signal paths 86. Each status signal has a dedicated signal path which couples a specific pin on the 38-pin connector 70 to a specific pin at port PC of processor 72. Parallel data is output from the processor 72 through 38-pin connector 70 to printer 14 over bus 88. Control signals (i.e., busy, acknowledge, strobe) are exchanged between the printer 14 and processor 72 over the plural signal paths 86. Each control signal has a dedicated signal path which couples a specific pin on the 38-pin connector 70 to a specific pin at port PC of processor 72.

Data is transmitted over the transmission lines 20, 22 as differential, serial +DATA and −DATA signals. Processor 72 activates LED 80 whenever data transfer over transmission lines 20, 22 is in progress. The differential signals +DATA −DATA are received at jack 74, then combined at driver 76. Note that the −DATA transmission line 22 is coupled to an inverting input of the driver 76. The combined serial data signal is coupled to a pin at port PD of processor 72. Processor 72 includes internal memory in which the received serial data is stored. According to one embodiment, software implements a 32-byte FIFO in the memory area of processor 72. Data is moved out of the FIFO in parallel format and transmitted out port PB along bus 88 to 38-pin connector 70 and printer 14. Transfer from the processor 72 to the printer 14 is performed using a conventional handshaking technique.

Status signals derived at processor 72 or received from the printer 14 are output from port PD and sent to the convert/transmit connector 16 via open-collector AND gate driver 78, jack 74 and status line 24. A second input to AND gate 78 is tied high so as to pass the status signals from the processor 72. The status communication is a redundant pulse-encoded signal. When the status line 24 is idle, the voltage level is approximately 10 volts as previously described. To send status indications, the status line 24 is pulsed to −12 volts. In one embodiment up to 1 6 status indications may be sent from the unconvert/receive connector 18 to the convert/transmit connector 16 as a serial multi-byte sequence in a prescribed status indication order.

The purpose of AND gate 78 is to isolate the processor 72 from the status line 24. Because the status line 24 also is used for transferring power to the convert/transmit connector 16, AND gate 78 protects the processor 72 from high current drive. An external AC power signal is transformed to a DC power signal which is input to unconvert/receive connector 18. The DC power signal ranges between +8 and +12 volts and is received at voltage regulator 84 which generates a supply voltage signal for the electrical components of the unconvert/receive connector 18. The DC power signal also is coupled to jack 74 for output over status line 24. Convert/transmit connector 16 includes circuitry (previously described) for parasitically deriving power from the signal received over the status line 24.

Power threshold sensor 82 receives the supply voltage signal so as to monitor the power level of the unconvert/receive connector 18. When the power goes below a threshold level, processor 72 is automatically reset.

Operation

In one embodiment, each processor includes the same code and tests itself at start-up to determine if it is configured into the convert/transmit connector 16 or the unconvert/receive connector 18. A designated pin at port PD is polled to perform the test. Such pin is wired high for processor 32 of convert/transmit connector 16 and wired to ground for the other processor 72.

Once identified, the processor 34 executes initialization and self-test functions. Thereafter, run-time operational transmit software is executed. Similarly, the processor 72 executes initialization and self-test functions of the receive software. Thereafter, run-time operational receive software is executed.

Regarding the run-time operational software, the processor 72 executes a loop sending a not busy status indication to the convert/transmit connector 16 every second. The processor 34 responds to the first such indication by changing its busy line (set busy at start-up) to not busy. The processor 32 then waits for data to be sent from the host computer 12. When data is sent, a strobe signal from the host will toggle. The processor 32 receives such strobe signal into port PC and reads a parallel data word. Processor 32 stores the input data into a software FIFO. Each time the strobe changes the processor reads in another word. Processor 34 signifies it is ready to receive by setting the not busy line and outputting back to the host 12 an acknowledge signal. processor 34 accesses the software FIFO comparing input and output pointers to determine whether data is present for routing to the other connector 18. Data is output from the FIFO and processor 34 at a pin at port PD onto signal path 60 and then to transmission lines 20, 22.

The processor 72 at connector 18 polls the data signal path from the transmission lines 20, 22 to determine whether a transmission is occurring. The serial data is received into processor 72, stored in a software implemented FIFO within the processor 72, then output in parallel format via port PB and 38-pin connector 70 to the printer 14.

Functional code for the run-time convert/transmit software and for the run-time unconvert/receive software is listed below:

```
Convert/Transmit Functional Code:
    TX status = do not send;
    DO forever
    [
        IF TX FIFO is not full and parallel character available
        THEN DO  {
                        GET character from parallel port;
                        Acknowledge character;
                        Remove parallel port BUSY indication;
                        PUT character in TX FIFO;
                    }
        IF voltage is low
        THEN DO  {
                        STOP serial character transmission;
                        Pause 320 microseconds
                        IF voltage is low
                        THEN DO  {
                                        RESET self;
                                    }
                        ELSE DO  {
                                        Pause 2 milliseconds;
                                        RESUME serial char transmission;
                                    }
                    }
        IF char in TX FIFO and transmit status = OK to send
        THEN DO  {
                        GET character from TX FIFO;
                        Transmit character out serial port;
                    }
        IF serial status from unconvert/receive connector avail
        THEN DO  {
                        IF serial status = XOFF
                        THEN DO  {
                                        transmit status = do not send;
                                    }
                        IF serial status = XON
                        THEN DO  {
                                        transmit status = OK to send;
                                    }
                    }
    ]
Unconvert/Receive Functional Code:
    SEND serial status = XON to convert/transmit connector;
    Receive status = OK to receive;
    DO forever
    [
        IF serial character available
        THEN DO  {
                        GET character from serial port;
                        PUT character in RX FIFO;
                        IF RX FIFO more than ¼ full
                        THEN DO  {
                                        SEND serial status = XOFF;
                                        Receive status = unable to
                                            receive;
                                    }
                    }
        IF parallel port not busy and RX FIFO character avail
        THEN DO  {
                        GET character from RX FIFO;
                        PUT character in parallel port;
                        TOGGLE parallel handshake;
                        IF RX FIFO is less than ¾ full
                            and receive status = unable to receive
                        THEN DO  {
                                        SEND serial status = XON to
                                            convert/transmit connector;
                                        Receive status = OK to receive;
                                    }
                    }
```

Concluding Remarks

An advantage of the hybrid interface is that both high-speed and long-line transmission is achieved for hard-wired communication. Although a preferred embodiment of the invention has been illustrated and described, various alternatives, modifications and equivalents may be used. For example although a software FIFO is described, a hardware FIFO or other buffer configuration may be used. Further, although the FIFO length is recited as 32 bytes the length may vary for different embodiments. Therefore, the foregoing description should not be taken as limiting the scope of the inventions which are defined by the appended claims.

What is claimed is:

1. A hard-wired hybrid interface for coupling a data sending device to a data receiving device, the data sending device sending data to the interface in parallel format, the data receiving device receiving data from the interface in parallel format, comprising:
   first means coupled to said data sending device for receiving parallel data from the data sending device and converting said parallel data to serial data;
   data signal path forming means coupled to said first means, said first means transmitting said serial data over said data signal path forming means;
   second means coupled to said data signal path forming means and said data receiving device for receiving said transmitted serial data, unconverting said serial data back to parallel data and outputting said unconverted parallel data to said data receiving device;
   status signal path forming means coupled to said first means and said second means for routing status information from said data receiving device through said second means and said first means to said data sending device;
   ground signal path forming means coupled to said first means and said second means;
   wherein one of said first and second means derives power parasitically from the other of said first means and second means via said status signal path forming means, said one of said first and second means comprising means for deriving power from a power signal carried on said status signal path forming means and means for storing charge derived from said power signal.

2. The interface of claim 1 in which said first means comprises:
   means for physically engaging the data sending device at a parallel I/O port; and
   first processing means receiving parallel data from the data sending device via said data sending engaging means for converting said parallel data to serial data.

3. The interface of claim 2 in which said first means is said one of said first and second means, said first means further comprising means for self-pacing power consumption in which transmission of said serial data is delayed by a first time period when power voltage drops below a threshold voltage level.

4. The interface of claim 3 in which said first means further comprises means coupled to said power deriving means for regulating said power signal to generate a regulated power signal; and in which said self-pacing means comprises said first processing means and detecting means, coupled to said regulating means, for detecting when voltage of said regulated power signal drops below said threshold voltage level, said detecting means generating a power indication signal which indicates whether said voltage is below said threshold voltage level, said first processing means receiving said power indication signal, said first processing means delaying transmission of said serial data by said first time period when said power indication signal indicates that said voltage is below the threshold level.

5. The interface of claim 1 in which said second means comprises:
   second processing means coupled to said data signal path forming means and receiving said transmitted serial data for unconverting said serial data back to parallel data; and
   means for physically engaging the data receiving device at a parallel I/O port, said second processing means outputting the unconverted parallel data to said data receiving device via said data receiving engaging means.

6. The interface of claim 1 in which said status information is sent as a multi-byte pulse encoded signal from said second means to said first means over said status signal path forming means.

7. A hard-wired hybrid interface for coupling a data sending device to a data receiving device, the data sending device sending data to the interface in parallel format, the data receiving device receiving data from the interface in parallel format, comprising:
   first means coupled to said data sending device for receiving parallel data from the data sending device and converting said parallel data to serial data;
   data signal path forming means coupled to said first means, said first means transmitting said serial data over said data signal path forming means;
   second means coupled to said data signal path forming means and said data receiving device for receiving said transmitted serial data, unconverting said serial data back to parallel data and outputting said unconverted parallel data to said data receiving device;
   wherein said data signal path forming device comprises a pair of differential transmission lines, said serial data being differentially transmitted over said lines to said second means.

8. A hard-wired hybrid interface for coupling a data sending device to a data receiving device, the data sending device sending data to the interface in parallel format, the data receiving device receiving data from the interface in parallel format, comprising:
   first means coupled to said data sending device for receiving parallel data from the data sending device and converting said parallel data to serial data;
   a pair of RS-422 differential transmission lines coupled to said first means, said first means transmitting said serial data as differential data signals over said transmission lines;
   second means coupled to said pair of RS-422 differential transmission lines and said data receiving device for receiving said transmitted serial data, unconverting said serial data back to parallel data and outputting said unconverted parallel data to said data receiving device;

RS-232 signal path forming means coupled to said first means and said second means for routing status information from said data receiving device through said second means and said first means to said data sending device;

ground signal path forming means coupled to said first means and said second means;

wherein said first means derives power parasitically from said second means via said RS-232 signal path forming means, said first means comprising:

a. means for deriving power from a power signal carried on said RS-232 signal path forming means;

b. means for storing charge derived from said power signal;

c. means for physically engaging the data sending device at a parallel I/O port;

d. first processing means receiving parallel data from the data sending device via said data sending engaging means for converting said parallel data to serial data; and e. means for self-pacing power consumption in which transmission of said serial data is delayed by a first time period when power voltage drops below a threshold voltage level.

9. The interface of claim 8 in which said first means further comprises means coupled to said power deriving means for regulating said power signal to generate a regulated power signal; and in which said self-pacing means comprises said first processing means and detecting means, coupled to said regulating means, for detecting when voltage of said regulated power signal drops below said threshold voltage level, said detecting means generating a power indication signal which indicates whether said voltage is below said threshold voltage level, said first processing means receiving said power indication signal, said first processing means delaying transmission of said serial data by said first time period when said power indication signal indicates that said voltage is below the threshold level.

10. The interface of claim 8 in which said second means comprises:

second processing means coupled to said pair of RS-422 differential transmission lines and receiving said transmitted serial data for unconverting said serial data back to parallel data; and data receiving engaging means for physically engaging the data receiving device at a parallel I/O port, said second processing means outputting the unconverted parallel data to said data receiving device via said data receiving engaging means.

11. The interface of claim 8 in which said status information is sent as a multi-byte pulse encoded signal from said second means to said first means over said RS-232 signal path forming means.

* * * * *